May 31, 1966     I. LIMANSKY     3,253,331
GLASS–METALLIZING TECHNIQUE
Filed Dec. 6, 1962
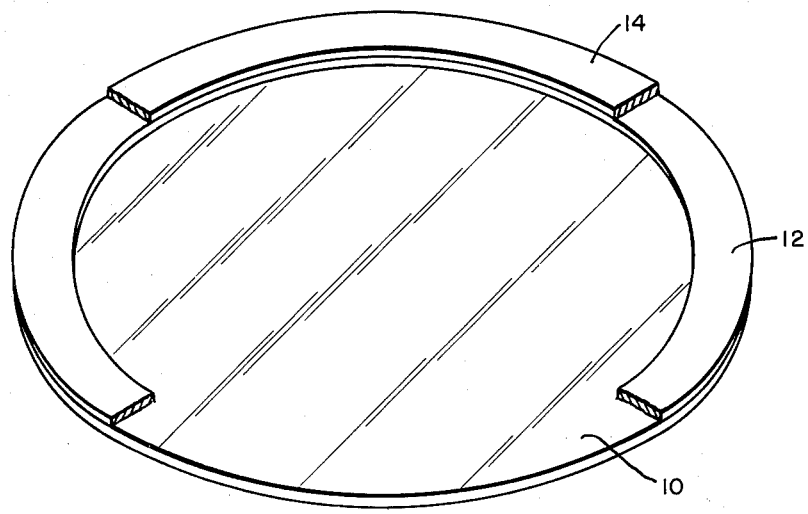
WITNESSES
Robert C. Baird
James F. Young
INVENTOR
Igor Limansky.
BY
Arnold E. Renner
ATTORNEY 3,253,331
GLASS-METALLIZING TECHNIQUE
Igor Limansky, Baltimore, Md., assignor to Westinghouse Electric Corporation, Pittsburgh, Pa., a corporation of Pennsylvania
Filed Dec. 6, 1962, Ser. No. 242,777
10 Claims. (Cl. 29—473.1)

The present invention relates to a method for metallizing glass with particular emphasis directed to a method for metallizing glass in preparation for a subsequent soldering operation.

While many ways of metallizing glass are known in the art so that a subsequent soldering operation may be performed, the majority of these methods utilize, at one time or another in the process, a flux. There are, however, certain instances in which the use of a flux must be avoided. Such a situation is in the manufacturing of very thin photogenerators of the solar generator type where the active photogenerator elements are disposed and sealed between two very thin sheets of glass. Examples of electron discharge devices (photogenerators) having an electrode assembly vacuum sealed between two sheets of glass are shown in two copending applications, Serial No. 25,674, filed April 29, 1960, now Patent No. 3,121,648 (Radiant Energy Converter by A. S. Jensen), and Serial No. 172,349, filed February 9, 1962 (Radiant Energy Converter by A. S. Jensen and I. Limansky), assigned to the assignee of the present invention. The use of a flux in this application would very likely contaminate the active elements of the photogenerator.

One known method, which is more fully set forth in United States patent application Serial No. 833,463, filed August 13, 1959, now Patent No. 3,103,067, and assigned to the assignee of the present invention, of soldering to glass without the use of flux is by utilizing a lead-tin-magnesium alloy and applying this alloy to the glass with the use of high frequency vibrations (e.g., 5 to 100 kilocycles per second). In this method, it is believed that the magnesium is the element which actually wets the glass. It is known that magnesium is a very active element and oxidizes very rapidly when exposed to the water vapor in the atmosphere. Thus, it is believed that the high frequency vibrations are highly desirable in this method to prevent a thin film of magnesium oxide from forming on the magnesium which would prevent the wetting of the glass. While the above-described method appears extremely satisfactory for a large number of applications, it is, in certain instances, somewhat unsatisfactory for two reasons. In the application of the trimetallic alloy using high frequency vibrations, it has been found that it is difficult to control with great accuracy not only the amount of solder applied but also the area to which the alloy adheres. Secondly, while the high frequency energy is not, in any way, harmful to relatively thick glass, it has been found that when it is applied to very thin fragile glass, especially in the range of 1 to 5 mils, that breakage of the glass often results.

It is, therefore, an object of this invention to provide an improved method for metallizing glass.

A further object is to provide an improved method for soldering to glass.

Another object is to provide an improved method for forming a vacuum solder seal between glass and metal or between two glass members.

Still another object is to provide an improved method for performing precise and controlled soldering operations on glass.

A still further object of this invention is to provide an improved method for soldering to very thin glass members.

A further object is to provide an improved method for soldering to glass without the use of flux.

Stated briefly, the present invention provides that prior to the use of a suitable soldering material, such as a lead-tin alloy, there is first disposed upon the glass member to be soldered, a thin layer of magnesium. This magnesium layer is deposited upon the glass by vacuum evaporation to provide a very tightly adherent coating to the glass. If desired, the magnesium layer may be limited in area by suitable means such as masking. In the embodiment utilized on very thin, fragile glass, the soldering material, an ordinary lead and/or tin solder, is preferably evaporated onto the magnesium layer. The thus coated glass member may now be removed from the vacuum and is ready for a subsequent soldering operation to metal or to a second glass member prepared in this or some other way. The invention also provides that a magnesium coated glass member may also be stored in atmosphere by first depositing directly upon the magnesium a thin layer of magnesium fluoride, which layer of magnesium fluoride protects the magnesium from the effects of water vapor in the atmosphere. In this embodiment, when the subsequent soldering operation is performed, high freqeuncy vibrations are preferably used, where possible, to break up the magnesium fluoride coating and the soldering operation is preferably performed in an inert dry atmosphere.

Further objects and advantages of the invention will become apparent as the following description proceeds, and features of novelty which characterize the invention will be pointed out in particularity in the claims annexed to and forming a part of this specification.

For a better understanding of the invention, reference may be had to the accompanying drawing, in which there is shown a perspective view of a glass member which has been metallized in accordance with the present invention.

With reference now to the drawing, there is shown a glass disc 10 onto which has been deposited a thin layer 12 of magnesium. While the layer 12 is shown to be in the form of a ring located at the periphery of the disc 10, it is understood that this is only illustrative and the layer 12 may cover the entire disc 10 or may taken on any other configuration as desired. The disc 10 is preferably a soda-lime glass, for example Corning #0080, or Corning #0021 which has been cleaned of oils and other undesirable matter by normal cleaning techniques. It is recognized, however, that other types of glasses will work. The layer 12 is deposited by known vacuum evaporation methods from a suitable boat at temperatures preferably in the range of from about 200 to 700 degrees centigrade. The annular design of the layer 12 may be achieved by masking or other suitable techniques which are also known in the art. While the thickness of the layer 12 is not critical, it has been found that a thickness corresponding to a white light transmission of from approximately 10 to 50 percent produces very satisfactory results for a subsequent soldering operation.

While it is not known with certainty why the magnesium adheres so tightly to the glass, it is known that magnesium is an extremely active element and as such oxidizes very readily. It is also known that most glasses contain oxides. Upon this basis, it is thought that when a thin film of magnesium is evaporated onto the glass in a vacuum, the magnesium forms a strong chemical bond with the oxides of the glass to produce the tightly adherent coating.

In the illustrated embodiment, after the magnesium layer 12 has been vacuum-evaporated onto the glass disc 10, a second layer 14 of suitable soldering material is vacuum-evaporated onto the magnesium. The layer 14 is comprised of any suitable soldering material such as lead, tin, or a lead-tin alloy. If the alloy form of soldering material is to be utilized, each of the elements are preferably evaporated onto the magnesium layer 12 from separate boats in order that the composition of the layer 14 is of the proper proportion. If the material of layer 14 were to be evaporated from a single boat in the alloy form, it is quite probable that the elements of the alloy would show preferential evaporation and hence the layer 14 would not be constant in composition throughout. On the other hand, when separate boats for each of the elements are utilized, it is possible to maintain each of the boats at the proper temperature to secure a uniform rate of evaporation of each of the elements, and hence a uniform composition in the layer 14. The layer 14 not only serves as a soldering material but also prevents the oxidation of the magnesium layer 12 when it is exposed to the atmosphere and water vapor.

A further possible method of achieving the desired coatings is by the utilization of preferential vacuum evaporation from the alloy form. For example, it is known that, at a pressure of about $10^{-6}$ torr, magnesium evaporates at about 250 degrees centigrade while tin evaporates at about 700 degrees centigrade. The result desired in accordance with the present invention is to have magnesium in contact with the glass and the solder material, tin in the present example, on the surface. Therefore, this result may be achieved by placing an alloy of magnesium and tin, in for example a ratio by weight of from 1 to 5 percent magnesium to 95 to 99 percent tin, in a single evaporation boat and slowly raising the temperature of that boat from about 250 degrees to about 700 degrees centigrade. Because of preferential evaporation, the magnesium would first evaporate and a layer of substantially pure magnesium would be deposited onto the glass. As the temperature of the boat is raised, the soldering material, here tin, would then evaporate and deposit on the magnesium.

In the earlier described method where the two layers 12 and 14 are sequentially deposited, the interface between these layers will be relatively distinct. However, in the latter described method of preferential evaporation, the interface will not be distinct and instead there will be a gradation in content from substantially pure magnesium in contact with the glass, to provide good adherence, to a surface of substantially pure soldering material (tin in the present example). Although the present embodiment has been described using tin, it is obvious that other solder materials may be utilized in the manner described. It is only necessary that the soldering material utilized have a higher temperature of evaporation than does magnesium.

Any of the above-described structures may now be soldered to a metal member, or a second glass member which has also been prepared as described, by placing either the two solder portions 14 in contact or by placing the metal in contact with the solder layer 14, as the case may be, and by the application of heat to the solder layer 14. Preferably, this soldering operation is performed in an inert, moisture-free atmosphere in order to preclude any possibility of magnesium oxide forming.

The above-described method has particular application for uses with glass of extreme thinness, e.g. in the range of 1 to 5 mils thick. In the case of thicker glasses, where high frequency vibrations can be utilized, the following alternate method may be employed. In the alternate method, the magnesium film 12 is disposed upon the glass 10 as before. After the magnesium film 12 has been deposited to the desired thickness, there is next disposed by vacuum evaporation upon the magnesium film, a thin film of magnesium fluoride (e.g. approximately 100–1000 A. thick). The magnesium fluoride film forms a strong protective coating over the magnesium and as such prevents the magnesium from reacting with the atmosphere and its associated water vapor. A glass thus prepared may be stored for an appreciable length of time without serious deterioration of the magnesium film. When it is desired to solder the glass thus prepared to a second member, it is only necessary that the two members are placed in contact and the solder applied to the magnesium fluoride film by the use of a high frequency vibration soldering iron. The high frequency vibrations serve to break up the thin magnesium fluoride film and the solder is thus allowed to directly contact the magnesium. Here as before, this soldering operation is preferably performed in an inert and dry atmosphere. While high frequency vibrations are preferred in this method utilizing magnesium fluoride as a protective coating, they are not necessary. Even without the use of high frequency vibrations, the heat and motion of the liquid solder will be sufficient to break up the magnesium fluoride film and permit the solder to contact the magnesium. However, in this latter case, it is evident that the solder joint may contain very small inclusions of magnesium fluoride. However, inasmuch as these inclusions are normally of diminutive size, they will not seriously affect the solder joint.

It is thus seen that there has been described a method for producing a tightly adherent metallized coating to glass which has particular application for soldering to very thin layers of glass.

While there have been shown and described what are at present considered to be the preferred embodiments of the invention, modifications thereto will readily occur to those skilled in the art. It is not desired, therefore, that the invention be limited to the specific arrangements shown and described, and it is intended to cover in the appended claims all such modifications as fall within the true spirit and scope of the invention.

I claim as my invention:

1. A method of metallizing glass as preparation prior to the deposition of a layer of solder comprising the evaporation of material directly upon said glass in an evacuated condition, said material consisting substantially of magnesium to form an adhering bond between said material and said glass, and maintaining said vacuum condition while depositing said layer of solder to prevent the contamination of said material.

2. A method of metallizing glass as preparation for soldering comprising vacuum evaporating a thin layer substantially of magnesium to form a tightly adherent coating onto said glass, said layer of material having a thickness corresponding to a white light transmission in the range of approximately from 10 to 50 percent and maintaining said vacuum while depositing a layer of solder to prevent the contamination of said magnesium layer.

3. A method of preparing a glass surface for a subsequent soldering operation comprising the steps of depositing a layer consisting substantially of magnesium onto said surface by vacuum evaporation, and subsequently depositing a thin layer of magnesium fluoride on said substantially magnesium layer whereby said magnesium is protected from the effects of the atmosphere.

4. A method of forming a soldered vacuum seal between two members, at least one of which is glass, comprising the steps of evaporating in an evacuated condition a layer of magnesium onto those glass portions desired to be soldered whereby said glass portions are provided with a metallized surface, maintaining said evacuated condition while applying molten solder between said metallized surface and a surface of said second member, and allowing said solder to solidify whereby there is formed a vacuum seal between said members.

5. A method of metallizing a glass member comprising the steps of providing an alloy of magnesium and a soldering material, said soldering material having a higher evaporation temperature than said magnesium and preferentially vacuum evaporating said alloy onto said glass member whereby a first region substantially of magnesium is deposited directly on said glass member and a second region substantially of solder is applied over said first region without contaminating said first region of magnesium.

6. A method of metallizing a glass member comprising the steps of providing an alloy of magnesium and tin, placing said glass member and said alloy in a near vacuum and slowly heating said alloy whereby through preferential evaporation there is deposited on said glass member a coating which is substantially pure magnesium in contact with said glass member and substantially pure tin at the surface of said coating and maintaining said near vacuum during said preferential evaporation to prevent contamination of said magnesium layer.

7. A method of metallizing a glass member comprising the steps of providing an alloy containing, by weight, magnesium in the range of from approximately 1 to 5 percent and tin in the range of from approximately 95 to 99 percent, placing said glass member and said alloy in a near vacuum and slowly heating said alloy whereby through preferential evaporation there is deposited on said glass member a graded coating which is substantially pure magnesium in contact with said glass member and substantially pure tin at the surface of said coating.

8. A method of providing a graded coating upon a glass member comprising the steps of providing an alloy containing, by weight, magnesium in the range of from approximately 1 to 5 percent and tin in the range of from approximately 95 to 99 percent, preferentially vacuum evaporating said alloy onto said glass member at a pressure of approximately $10^{-6}$ torr by raising the temperature of said alloy through the range of from approximately 250 degrees centigrade to approximately 700 degrees centigrade.

9. A method of preparing a glass surface for a subsequent soldering operation comprising the steps of depositing a layer comprised substantially of magnesium onto said glass surface in an evacuated condition, and subsequently depositing a layer of soldering material selected from the group consisting of lead, tin and alloys of lead and tin while maintaining said evacuated condition during the deposition of said layer of solder to prevent the contamination of said layer of magnesium.

10. A method of preparing a vacuum seal between two members, at least one of which is glass comprising the steps of: vacuum evaporating a first layer onto said member of glass in all of those areas where said seal is desired, said first layer including sufficient magnesium to tightly adhere to said glass, depositing a second layer of solder material selected from the group consisting of tin, lead or alloys of tin and lead onto said first layer while maintaining said vacuum, placing said members upon one another and heating said second layer to effect said seal.

References Cited by the Examiner
UNITED STATES PATENTS

| | | | |
|---|---|---|---|
| 2,129,125 | 9/1938 | Geyer | 29—472.5 |
| 2,746,140 | 5/1956 | Belser | 29—472.7 |
| 2,793,609 | 5/1957 | Shen et al. | 117—107 X |
| 2,995,475 | 8/1961 | Sharpless. | |
| 3,010,850 | 11/1961 | Colbert et al. | 117—107 X |
| 3,041,710 | 7/1962 | Geer | 29—473.1 X |
| 3,103,067 | 9/1963 | Dixon | 29—492 X |
| 3,103,741 | 9/1963 | Stoeckert | 29—472.5 |
| 3,113,846 | 12/1963 | Leschen | 29—195 |
| 3,150,939 | 9/1964 | Wenner | 29—195 |

OTHER REFERENCES

Belser, R. B.: Review of Scientific Instruments; vol. 25, No. 2, February 1954.

Belser, R. B.: (III) Review of Scientific Instruments; vol. 25, No. 9, pp. 862–864, September 1954.

Loftness, R. L.: Vapor Pressure Chart for Metals; July 10, 1952, U.S. Atomic Energy Commission Report NAA–SR–132.

JOHN F. CAMPBELL, *Primary Examiner.*

WHITMORE A. WILTZ, *Examiner.*

P. M. COHEN, *Assistant Examiner.*